(12) United States Patent
Breger

(10) Patent No.: US 6,283,595 B1
(45) Date of Patent: Sep. 4, 2001

(54) PINHOLE PRESBYOPIC CONTACT LENSES

(76) Inventor: Joseph L. Breger, 511 Ravine Dr., Highland Park, IL (US) 60035

( * ) Notice: Subject to any disclaimer, the term of this patent is extended or adjusted under 35 U.S.C. 154(b) by 0 days.

(21) Appl. No.: 09/511,940

(22) Filed: Feb. 24, 2000

(51) Int. Cl.[7] .................................................. G02C 7/04
(52) U.S. Cl. ............................................................. 351/161
(58) Field of Search ................................. 351/161, 160 R, 351/160 H, 162

(56) References Cited

U.S. PATENT DOCUMENTS

| | | | |
|---|---|---|---|
| 3,794,414 | 2/1974 | Wesley | 351/161 |
| 4,636,049 | 1/1987 | Blaker | 351/161 |
| 4,704,016 | 11/1987 | de Carle | 351/161 |
| 4,752,123 | 6/1988 | Blaker | 251/161 |
| 4,795,462 | 1/1989 | Grendahl | 623/6 |
| 4,890,913 | 1/1990 | De Carle | 351/161 |
| 4,976,534 | 12/1990 | Miege et al. | 351/161 |
| 5,608,471 | * 3/1997 | Miller | 351/161 |
| 5,812,236 | * 9/1998 | Seidner et al. | 351/161 |
| 5,864,379 | * 1/1999 | Dunn | 351/161 |
| 6,116,735 | * 9/2000 | Wada | 351/161 |

FOREIGN PATENT DOCUMENTS

2086605 * 5/1982 (GB) .

OTHER PUBLICATIONS

Cover page and pp. 3–12 of *Clinical Contact Lens Practice*, Edward S. Bennett and Barry A. Weissman, Revised Edition—1993.

*Contact Lens Practice* by Robert B. Mandell, O.D., Ph.D., Fourth Edition, 1988, pp. 462–466 and pp. 781 and 782.

*Contact Lens Correction* by Norman Bier and Gerald E. Lowther, 1977, pp. 330–332.

*Contact Lenses* edited by James V. Aquavella, M.D., and Gullapalli N. Rao, M.D., 1987, p. 117.

*Contact Lenses* edited Janet Stone and A. J. Phillips, 1972, pp. 366 and 367.

*Pinhole Contact Lenses*, Eugene Freeman, American Journal of Optometry, Jul. 1952, p. 1.

* cited by examiner

Primary Examiner—Jordan M. Schwartz
(74) Attorney, Agent, or Firm—Fitch, Even, Tabin & Flannery

(57) ABSTRACT

A bifocal simultaneous vision contact lens includes a central vision element and an outer vision element formed in a single, unitary, monolithic body of contact lens material. The central vision element has a diameter ranging between 0.85 and 1.75 mm, preferably ranging between 1 and 1.5 mm and most preferably ranging between 0.90 and 1.1 mm.

10 Claims, 2 Drawing Sheets

PINHOLE PRESBYOPIC CONTACT LENSES

BACKGROUND OF THE INVENTION

1. Field of the Invention

The present invention pertains to contact lenses and in particular to multi-focal lenses for simultaneously imaging objects at multiple distances (e.g., near, intermediate or far) in a wearer's eye.

2. Description of Related Art

Although the popularity of eyeglasses for use in mono vision correction remains strong, considerable attention has been directed to the use of contact lenses in correcting the more difficult vision problems of presbyopic patients and patients suffering from pathological conditions. The fitting of presbyopic contact lenses has become a specialized field, requiring fitting techniques and highly developed skills not required in other types of contact lens practice.

A contact lens can be fitted so as to remain centered on a patient's cornea or pupil (a so-called "central fit"), or the contact lens can be positioned off-center with respect to the wearer's eye. It is widely recognized that a contact lens is rarely stable in a person's eye and the shifting of the lens with respect to the pupil due to lid and eye movement, for example, has long been recognized.

A so-called "alternating vision" fitting practice relies on a shift in the wearer's eye to move the near and the distant correction portions of the lens with respect to the wearer's pupil. Even with fitting practices which rely on a relatively constant positioning of the contact lens about the wearer's eye, movement of the lens with respect to the pupil must be anticipated. One example of this latter type of fitting practice is the so-called "simultaneous vision" fit in which nearby and distant objects are simultaneously processed by the user, requiring mental differentiation of the resulting multiple images.

One approach for providing a precise fitting is to shape the contact lenses with a "close fit", closely conforming the curvature of the lens to the curvature of the patient's eye, so that movement of the lens about the eye is restricted. If the curvature of the lens is increased beyond this point, stability is attained at the expense of patient discomfort, and recent studies have indicated problems of inadequate circulation and cleansing and wetting action of tears associated with tighter-fitting lenses.

One type of vision correction that has been attempted over the years is commonly referred to as "pinhole lenses". These types of lenses have been considered for correction of presbyopia but have been rejected as reducing to an impractical extent, both the field of view and the brightness of the retinal image. These types of lenses are generally regarded as unsuitable, despite costly enhancements such as multi-range features where a central pinhole is surrounded by several radial lines. Although the field of view is improved somewhat, reductions in retinal image brightness are severe, and it is difficult for patients to read in many situations. As is well understood in the field of optics, enlarging the pinhole size to increase image brightness leads to a reduction in image sharpness, or resolution.

Prior art aperture-type pinhole lenses are made from black plastic stock so as to provide a dense black periphery around the pinhole, which is formed by drilling and subsequently filling the lens with clear plastic. Even when the pinhole lens is fitted so as to move with the eye and so as to be very closely positioned with respect to the entrance pupil, the field of view is still greatly restricted compared to other types of presbyopic vision correction. Construction costs are higher than other vision correction lenses, and the resulting performance has been disappointing, especially for normal vision patients who complain of excessive loss of light and non-specific types of visual disturbance. Cosmetic appearance presented by this type of pinhole contact lens has been found to be unacceptable for many patients.

In the construction of prior non-aperture pinhole lenses, the majority of the contact lens is made opaque with only the central pinhole aperture transmitting light. Accordingly, the cosmetic appearance presented by the pinhole contact lens is unacceptable for many patients. As mentioned above, radial lines are sometimes added to the pinhole of an opaque lens to improve peripheral vision. A series of non-opaque radial spokes are provided, emanating from the pinhole. These types of contact lenses present an unacceptable cosmetic appearance. According to work performed in association with the British Optical Association substantial disadvantages of pinhole lenses have been quantified. The diameter of the pinhole aperture is chosen between one and two millimeters according to the near addition. The higher the near addition, the smaller the aperture needs to be in order to provide the patient with acceptable vision correction. It is estimated that a 1.00 millimeter aperture is the equivalent of a very dark tinted spectacle lens. Further, the reduced field of view is estimated to be as little as fifteen degrees depending upon the distance of the lens from the eye's entrance pupil (interior chamber).

Although the pinhole contact lens provides improvement to correct refractive irregularities, especially for patients having irregular eye surfaces, the resulting reduced illumination renders the use of these types of lenses unacceptable in dim light and especially at night.

Because of the drawbacks reported by large numbers of healthy presbyopic patients, other types of vision correction are usually employed, and pinhole lenses are regarded as providing value for patients having low vision due, for example, to distorted pupils, scarred corneas or other impairment to the eye's optical system.

SUMMARY OF THE INVENTION

It is an object of the present invention to provide a "pinhole" type of contact lens overcoming the difficulties encountered with prior lenses.

Another object of the present invention is to provide a pinhole contact lens of the above type which is made from a unitary contact lens body which is not drilled or filled with external lens components.

A further object of the present invention is to provide a pinhole contact lens of the above type in which the vision correction portions of the lens are formed by cutting, molding or otherwise shaping a lens blank so as to form a central vision correction lens having a diameter ranging between 0.85 and 1.75 mm, preferably ranging between 1 and 1.5 mm and most preferably ranging between 0.90 and 1.1 mm. Either steeper-curve vision correction portions or a flatter-curve vision correction portions are formed on at least one major surface of the contact lens.

These and other objects of the present invention are provided in a bifocal simultaneous vision contact lens comprising:

a single, unitary, monolithic body of contact lens material having opposed anterior and posterior major surfaces;

a central vision element formed in the center of the body, to provide a first vision correction comprising one of said distance and said near corrections;

an outer vision element formed in the body, so as to surround said central vision element, to provide a second vision correction comprising the other of said distance and said near corrections; and said central vision element having a diameter ranging between 0.85 and 1.75 mm, preferably ranging between 1 and 1.5 mm and most preferably ranging between 0.90 and 1.1 mm.

DETAILED DESCRIPTION OF THE PREFERRED EMBODIMENT

Figure 1:
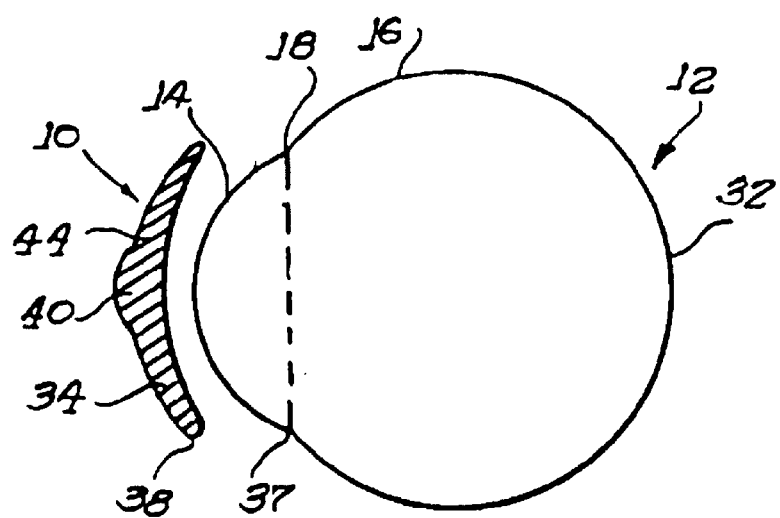
FIG. 1 is a front elevational schematic view showing one example of a contact lens fitting, according to principles of the present invention.

Referring now to the drawings, FIG. 1 shows a contact lens according to principles of the present invention generally indicated at 10 fitted to a human eye, generally indicated at 12. The eye includes a cornea 14 and a sclera 16 joined by a limbal area 18, 37. Images entering the eye through pupil 30 (see FIG. 2) are focused onto retina 32.

Figure 2:
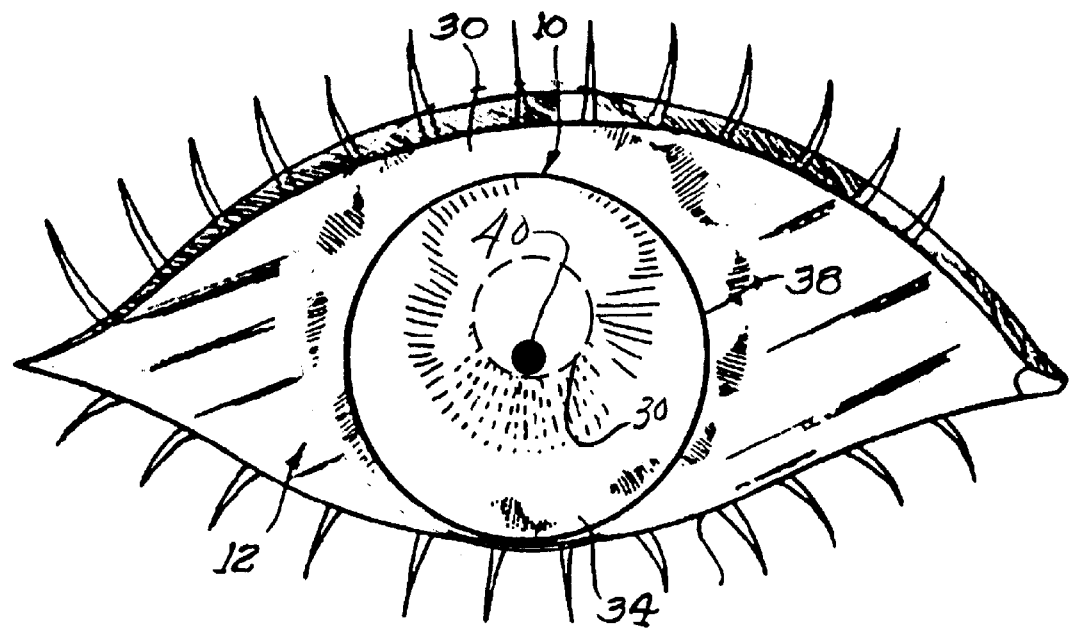
FIG. 2 is a schematic view showing a second, different fitting of the contact lens.

Referring to FIG. 2, it can be seen that the contact lens 10 is circular and can be employed in different fitting practices, such as the "low-riding" position shown, wherein the lens is shifted downwardly, below a point of centering about the wearer's pupil. The present invention can be employed with soft as well as hard contact lenses, and is readily adaptable to a wide range of fitting practices, including alternating vision and fixed methods.

Contact lens 10 is of the simultaneous vision, preferably concentric vision type, so as to provide bifocal correction for presbyopic patients, where images in different vision correction portions of the lens are simultaneously focused in the patient's eye. The contact lens is without apertures and is preferably constructed to have two concentric areas of vision correction, with the central "pinhole" element 40 (or vision correction portion) providing a first (distant or near) power correction, bringing (distant or near) vision objects into focus. An outer (near or distant) element 34 is illustrated in FIG. 1 as extending to the peripheral curve at the edge 38 of contact lens 10. If desired, a third intermediate concentric annulus can be added between the central and outer portions to provide a vision correction intermediate the central and outer vision prescriptions.

Lenses according to the present invention are made from a single, unitary monolithic blank. Preferably, the lens blank employed is of conventional (transparent) construction and is homogenous throughout. The central vision portion is formed from the lens blank using conventional means, such as numerically controlled lathe cutting. Techniques of this type are proven with respect to soft contact lenses, as well as hard contact lenses. Other conventional techniques, such as molding, or a combination of molding and lathe cutting can be employed, as well. A combination of cutting and molding techniques can be employed, for example, by cutting the base curve on the posterior surface of the lens and thereafter molding required vision correcting portions on the anterior surface of the lens.

According to principles of the present invention, the central vision correction portion of the lens is relatively small, and of a "pinhole" size, although a hole is not drilled or otherwise formed in the lens body 44. Rather, the present invention contemplates integral central vision correction potions formed on the lens surface by cutting or otherwise working the lens surface so as to form the desired vision correction powers. In the preferred embodiment, a CNC or digitally controlled lathe tool is used to work the anterior surface of lens 10 so as to form the appropriate shape. According to principles of the present invention, the central vision correction portion, of whatever power, is sized with a diameter ranging between 0.85 and 1.75 mm, preferably ranging between 1 and 1.5 mm and most preferably ranging between 0.90 and 1.1 mm. The first range covers the widest population of pupil sizes and the last two ranges covers progressively smaller pupil size populations.

Surprisingly, lenses constructed according to principles of the present invention, with integral center portions have been observed to provide improved peripheral vision compared to conventional "pinhole" lenses. Further, deterioration of the retinal image (that is, the observed apprehension of objects) viewed through the central correction portion (either distance or near) is found to be much less than conventional pinhole type lenses. Retinal illumination is also found to be surprisingly improved. With the present invention pinhole contact lenses can be used in lower light levels, and can be successfully employed with the wider range of "normal" patients, as well as low vision patients.

It is believed important (and may be critical, although criticality has not been fully determined at this time) that the transition between the integrally formed central and outer vision correction portions be made as small as practically possible, so that any resulting vision "gap" be virtually indiscernible by the wearer (I.e. the retinal image is made negligibly small). In the preferred embodiment, a cutting tip of 0.01 mm was used to form the central portion on the anterior surface of the lens blank. This resulted in a transition 'gap' of approximately 0.05 mm radius, and was found to be sufficiently small, without surface irregularities, shadows or blurs perceptible to the user. Cutting tips of 0.02 mm and 0.03 mm were also used and were found to yield acceptable results, with tip radii of 0.01 and 0.015, respectively.

Because of the small size of the central portion, lenses according to the present invention offer a practitioner a wide range of fitting methods, and have been observed to work well with lenses riding off-center, for example. Lenses according to the present invention work well without a ballast or other anti-rotation features which were necessary with prior pinhole type lenses.

Figure 4:
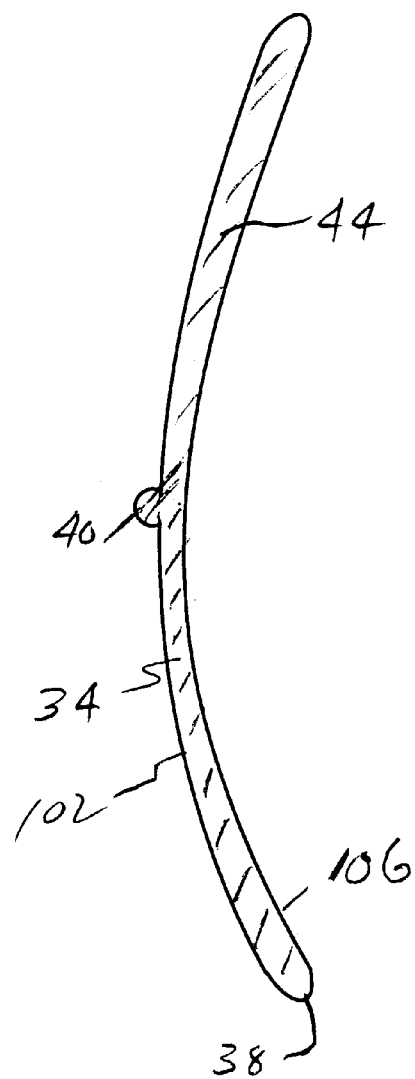
FIG. 4 is a side elevational view of the lens of FIG. 2.

The central vision portion is formed for the optical power desired. For example, referring to FIG. 4, the central portion 40 is formed by lathe cutting the remaining anterior surface 102 of lens body 44. If desired, the central vision correction portion can be formed on the posterior surface 106, although this is generally not preferred due to the added difficulty of the tooling operation, and resulting interference with proper fitting of the lens on the wearer's eye.

Figure 3:
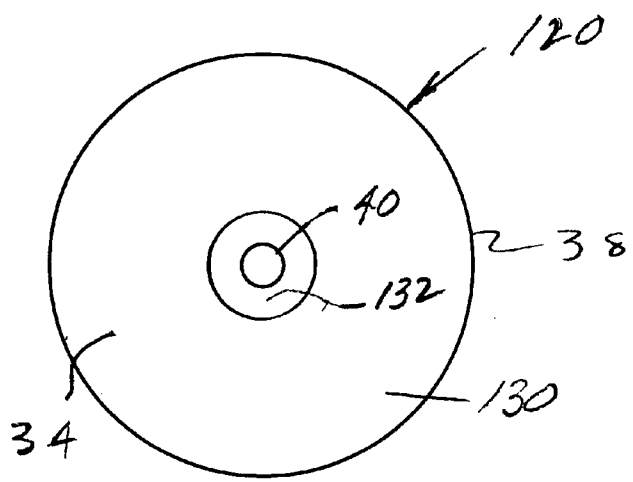
FIG. 3 is a front elevational view of another contact lens.

Referring to FIG. 3, the contact lens 120 is provided with a central pinhole portion 40 and an outer vision correction portion 34. An annular band or intermediate vision correction portion 132 lies between central pinhole portion 40 and outer vision correction portion 34.

Lens 120 is provided with three different optical powers in the three vision correction portions. Preferably, three different powers in the vision correction portions resolve images at near, intermediate and far distances, and the optical powers can be arranged in any of the vision correction portions. For example, the central pinhole portion 40 can provide any of the near, intermediate or distant powers needed for a particular patient. The remaining powers would then be provided in either vision correction portion 34 or 132. According to the present invention, the preferred fitting practice is to provide the center pinhole vision correction portion with a power corresponding to the patient's most demanding requirements. For example, three element lenses fitted for computer terminal operators would have the intermediate pinhole portion provided with an intermediate power (corresponding to a viewing distance for CRT screens), with the remaining distance and near powers being provided in vision correction portions surrounding the central pinhole portion. It is contemplated that the locations of the powers of a lens fitted to one of the patient's eyes is not repeated in the lens for the other patient's eye. For example, some patients may prefer a lens pair in which the central pinhole portion of one lens is shaped for an intermediate power (set, for example, to CRT viewing distances) while the central pinhole portion of the other lens is set for a near power (to accommodate documents viewed at a normal reading distance).

The optics of the central pinhole portions of lenses according to the present invention can be spherical or aspherical and, as pointed out above, can be formed on either major surface of the lens body. Further, as mentioned above, contact lenses according to the present invention can be of the soft lens or hard lens type and further can be a combination of soft and hard lenses. For example, inner portions of the lens can be of the hard lens type whereas outer portions of the lens can be of the soft lens type. However, according to principles of the present invention, the central pinhole portion is formed as an integral unitary part of the lens surface on which it is formed. Accordingly, the central pinhole portion is not formed by filling a hole formed in the lens body.

As mentioned above, the powers of the contact lens portions can be formed in either the anterior or the posterior major surface of the lens body, or both. The present invention further contemplates that the posterior surface of a lens can be shaped with a curve which alters some or all of the vision correction portions formed on the anterior surface of the lens, as is commonly employed in constructing "heavy plus" lenses.

The drawings and the foregoing descriptions are not intended to represent the only forms of the invention in regard to the details of its construction and manner of operation. Changes in form and in the proportion of parts, as well as the substitution of equivalents, are contemplated as circumstances may suggest or render expedient; and although specific terms have been employed, they are intended in a generic and descriptive sense only and not for the purposes of limitation, the scope of the invention being delineated by the following claims.

What is claimed is:

1. A two element bifocal simultaneous vision contact lens to correct vision of a wearer's eye comprising:

a single, unitary, monolithic body of transparent contact lens material having opposed anterior and posterior major surfaces;

a central vision element formed in the center anterior surface of the body as an integral portion thereof, to provide a first vision correction of near optical power;

an outer vision element formed in the anterior surface of the body, in direct contact with and surrounding said central vision element and extending to the peripheral curve at the edge of the contact lens, to provide a second vision correction of distance optical power to the remainder of the wearers eye;

said central vision element having a diameter no greater than 1.75 mm.; and said outer vision element cooperating with said central vision element so that said central vision element comprises a pinhole lens.

2. The contact lens of claim 1 wherein said central vision element has a diameter ranging between 0.85 and 1.75 mm.

3. The contact lens of claim 1 wherein said central vision element has a diameter ranging between 1 and 1.5 mm.

4. The contact lens of claim 1 wherein said central vision element has a diameter ranging between 0.9 and 1.1 mm.

5. The contact lens of claim 1 wherein said body of contact lens material is homogenous throughout.

6. The contact lens of claim 1 wherein said central vision element provides distance vision optical power.

7. The contact lens of claim 1 wherein said central vision element provides near vision optical power.

8. The contact lens of claim 1 wherein at least one of said outer and said central vision elements is formed on the anterior surface of said lens.

9. The contact lens of claim 1 wherein at least one of said central vision element and said outer vision element is formed on the posterior surface of said lens.

10. The contact lens of claim 1 wherein said central element and said outer element is formed by shaping said body by cutting, or by molding or both.

* * * * *